United States Patent [19]

Kato

[11] 4,309,843
[45] Jan. 12, 1982

[54] CULTIVATING DEVICE FOR PLANTS

[76] Inventor: Tadaaki Kato, No. 6473, Minami Minowamura Tabata, Kamiinagun, Naganoken, Japan

[21] Appl. No.: 186,394

[22] Filed: Sep. 11, 1980

[51] Int. Cl.³ .............................................. A01G 9/00
[52] U.S. Cl. ............................................ 47/18; 47/19
[58] Field of Search ...................... 47/2, 17, 18, 19, 29

[56] References Cited

U.S. PATENT DOCUMENTS

| | | | |
|---|---|---|---|
| 1,508,028 | 9/1924 | Robinson | 47/18 |
| 1,761,796 | 6/1930 | Mead | 47/19 |
| 1,777,798 | 10/1930 | Jones | 47/19 |
| 2,524,246 | 10/1950 | Young | 47/18 |
| 2,803,091 | 8/1957 | Radford | 47/18 X |
| 2,855,725 | 10/1958 | Carothers | 47/17 |
| 3,077,053 | 2/1963 | Fried | 47/19 X |

FOREIGN PATENT DOCUMENTS

| | | | |
|---|---|---|---|
| 11528 | 11/1923 | Czechoslovakia | 47/17 |
| 525351 | 5/1931 | Fed. Rep. of Germany | 47/19 |
| 633219 | 7/1936 | Fed. Rep. of Germany | 47/19 |
| 46191 | 3/1936 | France | 47/17 |
| 34642 | 5/1923 | Sweden | 47/19 |
| 192078 | 7/1937 | Switzerland | 47/17 |

*Primary Examiner*—James R. Feyrer
*Attorney, Agent, or Firm*—Armstrong, Nikaido, Marmelstein & Kubovcik

[57] ABSTRACT

A plant cultivation device comprised of a plurality of walls positioned parallel to each other and vertically inserted into the soil. Adjacent parallel walls are connected by a corrugated plate which has drainage holes positioned within parallel grooves on the plate. Hot water pipes are positioned within these grooves for supplying heat to the surrounding area. A layer of wood chips covers the hot water pipes and corrugated plate. The wood chip layer is in turn covered by a layer of cultivation soil. Steam discharge pipes are positioned adjacent to the partition walls at a point above the cultivation soil and are covered by a shield which interconnects to adjacent walls. High pressure steam sterilizes the air and soil and thus promotes the healthy growth of plant life.

3 Claims, 3 Drawing Figures

CULTIVATING DEVICE FOR PLANTS

BACKGROUND OF THE INVENTION

1. Field of the Invention

This invention relates to the field of cultivation devices for plants. More particularly, this invention relates to the field of cultivation devices which promote the growth of vegetable and flowering plants by supplying desirable temperature and humidity conditions.

2. Description of the Prior Art

In order to promote the growth of plants such as vegetables and flowering plants, it has been well known to supply these plants with proper quantities of fertilizer. The application of the correct amount of fertilizer in combination with the possible use of fungicides and insecticides promotes the growth of the plant life. Therefore, it has been well known to utilize various types of chemicals in order to bring about desirable results during the cultivation of plant life. In addition to the use of chemicals to promote the growth of plant life, it has been known that the utilization of a greenhouse or hothouse is useful in order to promote growth. The temperature and humidity of the air within the greenhouse can be regulated within desirable parameters which are known to be effective in promoting the growth of particular plants.

SUMMARY OF THE INVENTION

A device for cultivating plant life is disclosed. The device is comprised of a plurality of partition wall plates which are vertically positioned into the soil. Steam discharge pipes are positioned on the top edge of each of the partition wall plates. Adjacent wall plates are interconnected by a corrugated plate which has a plurality of parallel grooves and ridges thereon. Hot water pipes are positioned in the grooves of the corrugated plate. Under the corrugated plate is positioned a plurality of open ended, hollow blocks, such as concrete blocks. The corrugated plate has water drain holes in the grooves which allows for drainage of water downward toward the open ended, hollow concrete blocks. The partition wall plates are interconnected by a shield which covers over the entire device.

The best results may be obtained by spreading a layer of wood chips over the corrugated plate and hot water pipes. Over the layer of wood chips is placed a layer of cultivation soil. The shielding or covering plate is comprised of a transparent material which allows the appropriate amounts and frequencies of light to pass through. By discharging steam from the steam discharge pipes and by running hot water through the hot water pipes, the soil in the upper portion of the plants can be maintained at a desirable temperature and humidity condition.

It is a primary object of this invention to present a device comprising a plurality of partition wall plates, a plurality of steam discharge pipes, a corrugated plate, a plurality of hot water pipes, and a shielding.

Another object of the invention is to provide such a device which is capable of maintaining desirable temperature and humidity conditions of plants being grown.

Still another object of this invention is to provide such a device which is capable of providing the desirable temperature and humidity conditions at a low cost.

Yet another object of this invention is to provide such a device which is capable of improving the growth of plants.

Another object of this invention is to provide such a device which is capable of being utilized to supply chemicals such as insecticides or fungicides to the plants.

Another object of this invention is to provide a device which is capable of promoting aesthetically attractive growth, as well as the more rapid growth of vegetable and flowering plants, at a low cost. These and other objects and advantages of the present invention will become apparent to those persons skilled in the art upon reading the details of construction and usage, as more fully set forth below. Reference being made to the accompanying drawings forming a part hereof wherein like numerals refer to like parts throughout.

DESCRIPTION OF THE PREFERRED EMBODIMENTS

Before the present plant cultivating device is described, it is to be understood that this invention is not limited to the particular parts or arrangement of parts shown, as such devices may, of course, vary. It is also understood that the terminology used herein is for the purpose of describing particular embodiments only; it is not intended to be limiting, since the scope of the present invention will be limited only by the appended claims.

Figure 1:
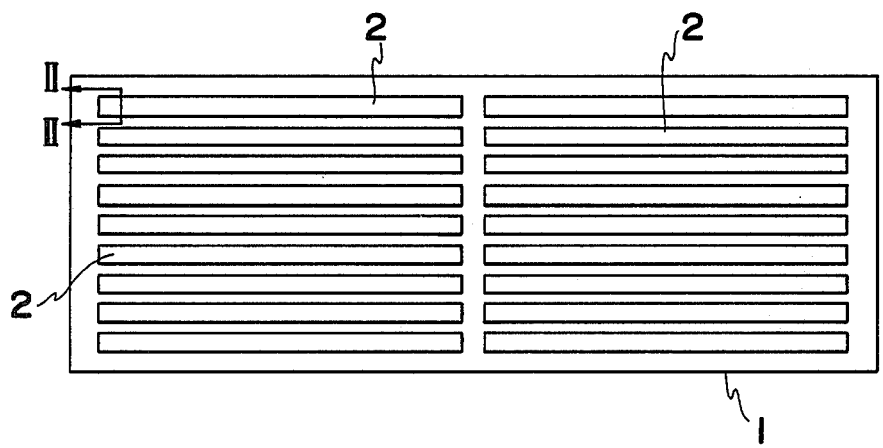
FIG. 1 is a plan view of the device as installed inside a hothouse.

FIG. 1 is a plan view of the device as it might be installed within a hothouse or greenhouse 1. The plant cultivating device has its partition walls 2 running in parallel rows within the greenhouse. Although it is desirable to utilize the device within the greenhouse or hothouse, it should be noted that the device may be utilized in an open field.

Figure 2:
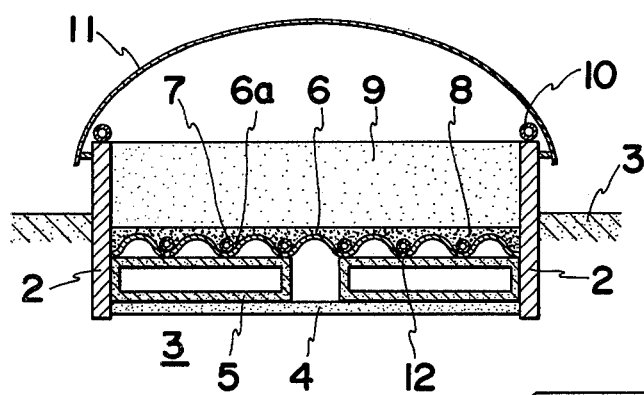
FIG. 2 is an enlarged cross-sectional view taken along the line II—II of FIG. 1.

Referring now to FIG. 2, which shows an enlarged cross-sectional view of the device. Each row of the device, as shown within FIG. 1, is comprised of two partition wall plates 2, as shown within FIG. 2. The wall plates 2 are positioned vertically in the soil, having their lower portions embedded into the soil 3 and their upper portions extending outwardly from the soil 3.

Steam discharge pipes 10 may be positioned on the upper edge of each of the partition wall plates 2. The steam discharge pipes 10 are covered by a transparent shielding 11 which is connected between the two adjacent partition wall plates 2. It should be noted, however, that the shielding 11 may be connected between non-adjacent partition wall plates 2.

Sand 4 is placed between the walls 2 at their lowermost portions. On top of the sand 2 is placed open-ended hollow blocks, such as open-ended hollow concrete blocks 5. On top of the concrete blocks 5, is positioned a slate-corrugated plate 6. The plate 6 has concave portions 6a therein. As shown within FIG. 2, the corrugated plate has a plurality of parallel grooves and ridges.

Figure 3:
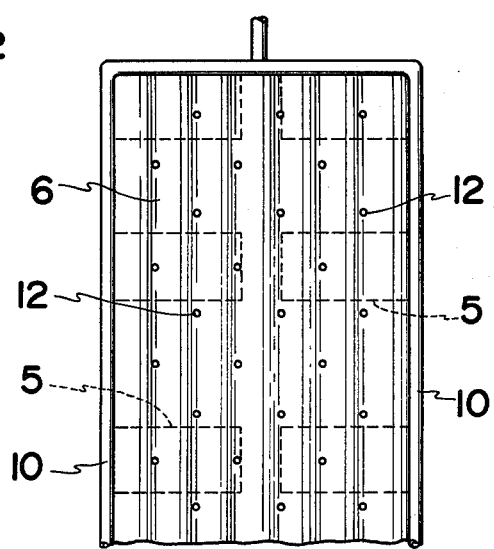
FIG. 3 is a plan view of the device as shown within FIG. 2.

Within the grooves or concave portion 6a of the corrugated plate 6, are water drain holes 12. The water drain holes 12 may be seen more easily within FIG. 3, which is a plan view of the device as shown within FIG. 2.

Hot water pipes 7 are positioned within the grooves or concave portions 6a. A layer of chip material, such as a layer of wood chips 8, is placed over the corrugated plate 6 and hot water pipes 7.

Sandwiched between the partition wall plates 2 is a layer of cultivation soil 9. The soil 9 is, or course, positioned on top of the chip layer 8. The plants, such as vegetables or flowering plants (not shown) are planted within the layer of cultivation soil 9. The chip layer 8 is utilized for the drainage of water. Excess water which is not used by the plants drains into the chip layer 8 and onto the corrugated plate 6. When the water reaches the plate 6, it flows into the concave portion 6a and then outward through the water drain holes 12. The hollow portions within the blocks 5 provide additional drainage space for water. It is possible to position the blocks 5 in such a manner as to allow for the drainage of water through the blocks 5 to a low point. However, water drainage is also facilitated by the layer of sand 4 which is positioned underneath the blocks 5.

The open cavity within the blocks 5 allows for the passage of fresh air from outside to reach the plants growing within the soil 9. During colder periods, it is possible to float warm air through the passages created within the blocks 5. This allows for the heating of the plants by utilizing only a small amount of warm air. In conventional hothouses, a much larger amount of air must be heated in order to warm the plants. Therefore, the present invention uses significantly less fuel than prior art devices, such as hothouses.

The hot water pipes 7, which are disposed within the concave portion 6a, may be comprised of iron or a synthetic resin material. Hot or warm water flows from a boiler (not shown) through the pipes 7, in order to keep the cultivating soil 9 at a proper temperature. Since the pipes 7 are positioned within the concave portion 6a, they are not damaged by the blades of cultivation tools, such as hose, which might be utilized for tilling the soil.

Although the hot water pipes 7 are generally positioned within the concave portion 6a, they may be positioned elsewhere within the cultivation soil 9. For example, it would be possible to position pipes, such as the pipes 7, alongside of the partition wall plates 2, or at any other place within the soil 9. The pipes might then be utilized for supplying not only heat but water, insecticides, fungicides, and fertilizers to the plants.

The partition wall plates 2 may be comprised of metal, synthetic resin, glass fibers or concrete products. The steam discharge pipes 10 may be provided with a brass nozzle (not shown) at discharge points along the pipes. The pipes 10 should be comprised of a material which is resistant to heat and corrosion.

Prior to beginning cultivation within the soil 9, high temperature and pressure steam of about 150° C. is discharged from the pipes 10 to the upper surface of the cultivation soil 9 in the area between the soil 9 and the shielding 11; this sterilizes the upper portion of the soil and the air existing within the area between the soil and the shielding 11. The sterilization aids in the elimination of unwanted funguses, insects, as well as undesirable plant life, such as weeds. After the air and soil have been sterilized, cultivation within cultivation soil 9 may be commenced.

In addition to utilizing the pipes 10 to supply high pressure/high temperature steam for sterilization, the pipes may also be utilized to supply warm, humid air, water, or other desired chemicals; such as fertilizers, insecticides, and fungicides, when necessary during the growth of the plants. However, due to the use of the high pressure/high temperature steam, prior to beginning cultivation of the plants, it has been found that larger, more aesthetically pleasing vegetables and flowering plants can be produced with a significantly less need for chemicals during the cultivation of the plants. The sterilization makes it possible for the plants to grow without bacterium adhering to either vegetables or flowers and virtually eliminates diseases and weeds in the cultivation area.

It should be noted that the shield 11 may be hinged at one side to a partition wall plate 2, in order to allow easy access to the cultivation soil 9. In another embodiment, the shield 11 may be constructed so that it is easily removable from the partition walls 2. The shielding 11 should, of course, be comprised of a transparent material which allows for the passage of sufficient amounts of light, as well as the correct frequencies of light, which are desirable for the cultivation of the particular plants being grown.

The instant invention is shown and described herein in what is considered to be the most practical, and preferred embodiments. It is recognized, however, that departures may be made therefrom which are within the scope of the invention, and that obvious modifications will occur to one skilled in the art.

What is claimed is:

1. A plant cultivating device, comprising:
    a plurality of partition wall plates, each being vertically positioned and having an upper portion and a lower portion;
    a plurality of steam discharge pipes connected to said partition wall plates at said upper portion;
    a corrugated plate interconnecting adjacent wall plates, said corrugated plates being positioned horizontally and being connected to said wall plates at said lower portion, said corrugated plate having a plurality of parallel grooves and ridges, with a plurality of holes positioned in said grooves;
    a plurality of hot water pipes positioned in said grooves;
    a shielding connected to said wall plates at said upper portion and enclosing an area between said wall plates.

2. A plant cultivating device, as claimed in claim 1, further comprising:
    a plurality of open ended hollow blocks positioned beneath said corrugated plate.

3. A plant cultivating device, as claimed in claim 2, further comprising:
    a layer of chips positioned over said corrugated plates and hot water pipes; and
    a layer of cultivated soil positioned over said layer of chips.

* * * * *